United States Patent [19]

Hentzschel et al.

[11] 4,287,402
[45] Sep. 1, 1981

[54] CONTROLLING UPSETTING DURING WELDING OF A SPLIT TUBE

[75] Inventors: Erhard Hentzschel, Solingen; Erhard Jaspert, Düsseldorf; Kurt Niederhoff, Ratingen-Lintorf, all of Fed. Rep. of Germany

[73] Assignee: Mannesmann AG., Düsseldorf, Fed. Rep. of Germany

[21] Appl. No.: 46,380

[22] Filed: Jun. 7, 1979

[51] Int. Cl.³ .............................................. B23K 31/06
[52] U.S. Cl. ..................................... 219/61.5; 219/67; 72/16; 228/147; 356/386
[58] Field of Search ......................... 219/61.2, 61.5, 67, 219/59.1, 60.2; 228/147, 17.5; 356/373, 386; 72/16

[56] References Cited

U.S. PATENT DOCUMENTS

| | | | |
|---|---|---|---|
| 3,212,311 | 10/1965 | Inoue | 72/16 |
| 3,295,214 | 1/1967 | De Neergaard | 356/373 X |
| 3,573,416 | 4/1971 | Drechler | 219/61.5 X |
| 3,845,645 | 11/1974 | Gebauer | 72/16 X |
| 3,899,651 | 8/1975 | Bowman et al. | 219/61.5 X |

*Primary Examiner*—E. A. Goldberg
*Assistant Examiner*—Keith E. George
*Attorney, Agent, or Firm*—Smyth, Pavitt, Siegemund & Martella

[57] ABSTRACT

Markings are placed alongside the gap of a split tube and their distance is measured downstream from the point of welding; the measuring result is used to control upsetting pressure in the weld print.

4 Claims, 7 Drawing Figures

$$\frac{B_1}{A_1} = \operatorname{tg} \alpha$$

CONTROLLING UPSETTING DURING WELDING OF A SPLIT TUBE

BACKGROUND OF THE INVENTION

The present invention relates to the control of the upsetting pressure during resistance welding of a tube or pipe as made from flat, endless skelp or strip being formed into such a tube or pipe.

The making of tubing from skelp or strip is a process of long standing. The strip or skelp is formed into a tubular hollow (split tube) and adjoining or abutting edges are, for example, electrically resistance welded. In the past, it was up to the welder to determine and monitor the requisite parameters for welding such as the pressure under which the edges are forced against each other in the welding spot the temperature of welding, the speed or progression, etc.; significant experience was required to produce a salable product with but a few or no rejects.

It is apparent that temperature and speed measurement and control as well as control over the pressure is essential with emphasis on reproducing similar parameters under comparable conditions. U.S. Pat. No. 3,573,416 is an example for a welding procedure in which the upsetting pressure is measured among several other operating parameters for the resistance welding.

Many experiments and investigations concerning welding parameters failed because there are too many interfering factors. For example, dirt in the various mechanical parts such as guides and bearings, forces and their distribution on the periphery of the tube, etc. Measuring specifically (to the exclusion of other parameters) the local pressure which urges the two edges being, about to be or just having been welded together, is almost impossible, simply because any measuring results include inherently one or more interfering parameters which cannot be isolated.

DESCRIPTION OF THE INVENTION

It is an object of the present invention to measure a parameter which faithfully represents the tangentially effective edge pressure in the point of welding of a split tube. Moreover, the measuring result should be reproducible so that it can be used in this capacity for controlling the welding process to ensure uniformly high quality of the weld.

In accordance with the preferred embodiment of the invention, it is suggested to place markings adjacent to the not yet welded-together edges, i.e., upstream from the welding and to measure the distance between these markings downstream from the welding point. The markings are placed either at a fixed distance from each other or at fixed distances from the still apart edges of the split tube. In the former case, that gap between the edges should be measured separately in the plane of marking. Thus, the invention measures the upsetting path by measuring the reduction in the circumference of the tube from the time of initial contact up to the time of upsetting the welding seam and the forming of the internal and the external beads. The portion in the reduction of the circumference attributible to a wall thickening on account of the applied pressure is not considered. Thus, one does not introduce incorrect conclusions that may arise when the pressure is measured directly.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a tube or pipe section R which, in the portion shown more to the front, is a split tube, but the gap has been closed in the rear by welding. The current weld point is denoted Sp. The tube proceeds in the direction of the arrow, the welding equipment remains stationary.

Reference numeral 1 denotes a plane of marking, extending transversely to the axis of the tube; and being located upstream from the welding point Sp, FIG. 2 can also be interpreted as a section view through the tube in that plane. FIG. 1 shows also the location of a scanning plane 2 downstream from the welding point, and FIG. 3 can be interpreted as a section view taken in this plane.

FIG. 1 shows also that two markings M and M' in the plane 1 and to both sides of the open gap of the tube are spaced here by a distance A. The distance between these markings is reduced to A' in the plane 2. The upsetting distance S is determined by the difference $(A-A')-A_o$, wherein $A_o$ is the gap width in plane 1.

Turning now to FIG. 2, the marking equipment as effective in plane 1 is comprised of a laser 11, a semi-transparent mirror 9 and a second mirror 10 arranged parallel to mirror 9, both mirrors intercepting the laser beam at a 45° angle. The two mirrors are spaced in that direction of the incoming beam by the distance A, so that the two reflected beams have that distance (spacing of the beam centers). The latter aspect is decisive; if the laser beam is differently directed as far as the laser and its position is concerned, then the two mirrors must be placed differently.

FIG. 2 shows also a more precise definition of the gap width $A_o$; it is the distance of the two outermost edges from each other. Not shown in FIG. 2 is a measuring device for the width of the gap $A_o$. A device measuring that width on a running basis may not be needed if the process forming the split tube is sufficiently accurate. Nevertheless, that width $A_o$ must at least be measured once, possibly manually, possibly with occasional repetition and verification.

Figure 1:
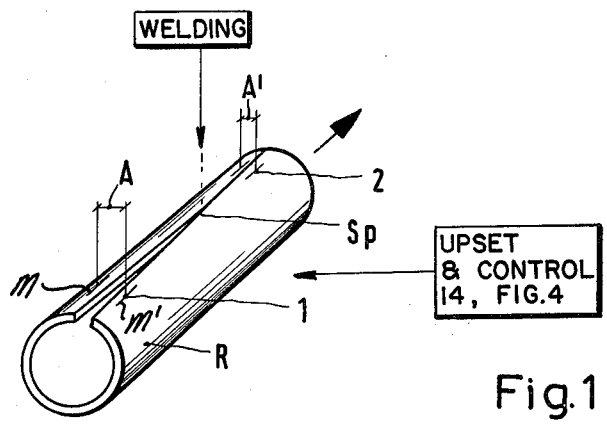
FIG. 1 is a perspective view of a tube being welded, for illustrating the geometry of the aspects involved in the present invention.

The markings are placed by fusion of the surface of the tube, a little off these outer edges. The markings specifically result from well-defined and limited local melting of the pipe's material. These markings, therefore, increase the reflectivity of the surface and within sharply contoured, thin lines.

Alternatively, one may use other modes of marking, such as by spray painting, placing of reflective foil strips, etching, or the like. The markings should be thin; but most importantly, they should have sharply defined contours. These markings may be placed on a continuous basis, i.e., in form of lines extending for the length of the tubes. Alternatively, one may space them intermittently. In the latter case, one may impose a restriction on the frequency in the detection of errors and, thus, limit the bandwidth of the control operation. If the frequency or any deviations, i.e., the rate of error increase is small, intermittently marking may well suffice. This is also true here as the detection and scanning process of the markings is an intermittent one. On the other hand, placing lines of markings may be simpler. The laser 11 may just be on and mark; no need to turn it on or off.

Reference numeral 13 refers schematically to a contactless measuring device for the longitudinal, i.e., axial speed of the tube. The speed measuring device may also be a laser or any other scanner operating on the basis of correlation.

Figure 3:
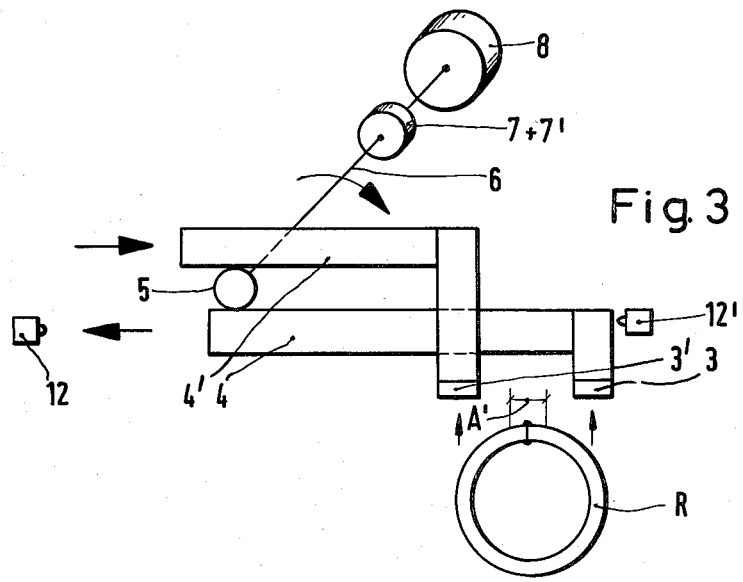
FIG. 3 is a schematic view of equipment for scanning the markings placed as per FIG. 2 and in a plane downstream from welding.

FIG. 3 now shows the scanner for the markings being located downstream from the welding point in plane 2. The scanner includes a motor 8 driving a pinion 5 on a shaft 6. This pinion meshes with two arms 4 and 4', being provided with rack-like gearing and moving in opposite directions. Each arm carries a reflective-type optical scanner 3 and 3', respectively.

Each scanner 3, 3' has its own (regular) light source and a photodiode as light detector. The scanners are placed so that upon passing over either of the markings, the respective source produces a rectangular light spot of about 10 mm by 0.8 mm, the short dimension being in the direction of displacement of the spot on account of the movement of arms 4, 4'. Since the scanners 3, 3' must not be in each others way, they move in parallel paths, but not colinearly. On the other hand, the axes of detection may be oblique so that the scanning spots do run colinearly and similar portions of the markings are traversed. However, it was found that this is not too critical. Relevant readings are still obtained, even if the light spots do not run colinearly. Variations in marker spacing to be detected do not occur over such short axial distances as given by the axial dimensions of the light spots.

The stroke of arm movement is limited by end switches 12, 12', whereby upon abutment of arm 4 with either switch the direction of arm movement is reversed. Thus, the two arms constitute an oscillating or periodically reciprocating scanner.

FIG. 3 shows also a pair of pulse sources 7, 7' on shaft 6, being, for example, constructed as slotted disks which are optically scanned to produce a train of pulses. The rate of pulse production determines the resolution.

Figure 4:
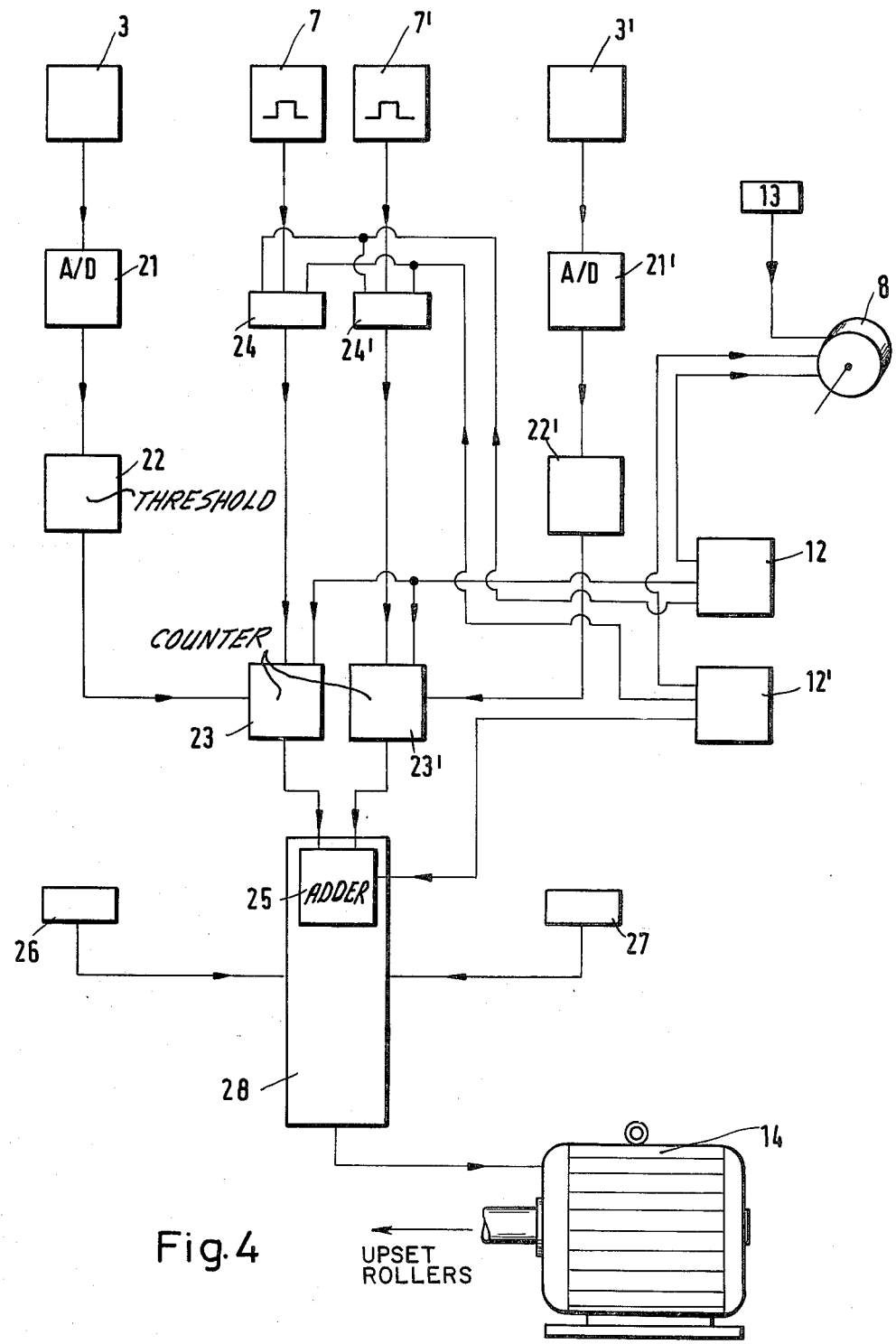
FIG. 4 is a system diagram for practicing the present invention.

Turning now to the system as depicted in FIG. 4 showing the control of motor 8 by the two end switches 12 and 12'; each time arm 4 hits one of the switches, motor 8 is reversed to drive arm 4 in the opposite direction; arm 4', of course, reverses likewise. Additionally, motor 8 is speed-controlled by the tube speed meter 13 so that the rate of scanning is slaved directly to the tube advance. Switch 12, in addition, is connected to two counters, 23 and 23', to reset the counters to zero or a particular value.

These two counters 23, 23', respectively, count pulses from the sources 7 and 7', provided they are permitted to pass gates 24, 24'. These gates incorporate switches to turn the gates on in response to a signal from end switch 12 (concurring with restart of the counters) while the gates are turned off in response to a response of switch 12', to remain off during retraction of the scanners.

The two counters receive additionally signals from the transducers or detectors in scanners 3 and 3'. These are the output signals from the photodiodes. The signals are, for example, digitized by converters 21, 21' whose outputs are fed to digital threshold detectors 22, 22' for purposes of noise suppression. The threshold detector will particularly respond to the brightness increase resulting from the reflection of the markers. It should be noted (see FIG. 3) that during a scan little or even no light is reflected back to the detectors 3, 3' until they are close to the markings of the upturned tube. The signal increase, resulting from increased reflection by a marker or marking line, is used for example to strobe the count number into an output register so as to "freeze" the count state, to be transferred shortly thereafter to an adder 25.

It will readily be seen that counter 23, thus, furnishes a count number which indicates the count state from the time arm 4 reversed the movement by operation of switch 12 to the time detector 3 responds to the first marking.

Shortly before, concurrently, or shortly thereafter, detector 3' on arm 4' responds to its passage over the other, second marker, and the state of counter 23' is fed to the second input of the adder 25 to form a composite signal. Shortly thereafter, detector 3 on arm 4 will pass over the second marking and detector 3' will pass across the first mentioned marking. Again, the count values are detected and fed to the adder, which adds them together.

The difference between this second scan and the scan formed after the detectors had passed for the first time across markings is directly representative of the distance between the markings. The double-scan eliminates any error that may arise from a one-sided approach of any of the markings by either scanner. Each marking is scanned from both sides. One can also say that one establishes an average of two distance measurements, the first one being the one established by the two-count states of the first scanner, the second one by the two-count states of the second scanner. Since the pulses are derived from the motor 8 which determines the cycle rate and speed of scanning, the resulting variation in pulse rate maintains the proportionality between pulse rate and incremental advance of the scanners 3, 3' in between two pulses so that the proportionality between count result and distance remains invariant.

Figure 2:
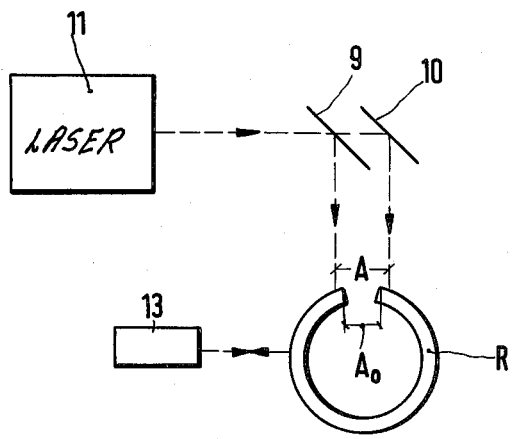
FIG. 2 is a schematic view of equipment for marking the tube in a first plane transversely to the axis of the tube upstream from welding.

The calculating or computing facility 28, of which adder 25 may be a part, establishes this difference and adds thereto (or subtracts therefrom) a corrective value (26) which is constant, for example, as long as the width $A_o$ of the gap or the split tube is plane 1 (FIG. 2) remains constant. The gap width may be measured and may vary, and the result should be introduced as corrective parameter. Finally, the computer receives (i.e., has stored in its memory) a desired and reference value 27 for the upsetting path.

The reference value is compared with the measurement of the distance between the marking down-stream from the welding spot, and the result is an error signal to be used to control a step motor 14 which positions the rolls (not shown), urging the edges of the skelp together in the welding point and thus determining the upsetting length. This adjusting device for the rolls should function without play and backlash.

If one assumes that the two planes for marking and scanning are spaced by about one (1) meter, and if one further assumes that a full cycle for the scanner takes about one second, for a 120 m/min pipe and weld speed, corrective action can already be taken after about a 2-meter tube passage, which suffices as incorrect upsetting to the point of resulting in an incomplete weld does not develop very rapidly. Depending upon the sensitivity and error tolerances, on can keep the welding operation within tight tolerances. It can readily be seen that in lieu of the particular mechanical scanner, one can use others, including pivotable mirrors or other linear scanners operating at a higher speed. The scanner may be stationary such as a linear array of photosensitive semiconductor elements. One could also use a rotating scanner. It will be appreciated further that one needs to cool the electric and electronic components doing, or participating in, the scanning due to the requisite vicinity of the welding spot. Also, the scanner should include filters to eliminate thermoradiation of the steel pipe and of the rather hot welding seam. One should use short wavelength (blue). Also, daylight should be eliminated.

Figure 5:
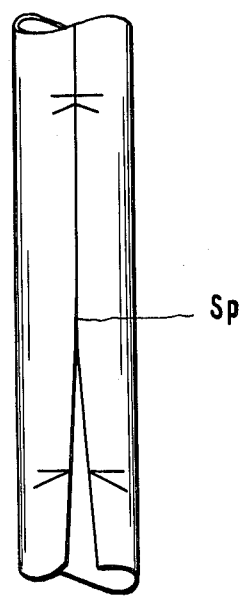
FIG. 5 is a top view of a tube, but being marked differently.
Figure 6:
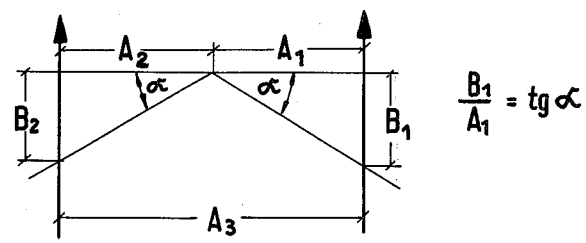
FIG. 6 is a geometric representation of parameters involved in the process when marking as per FIG. 5.
Figure 7:
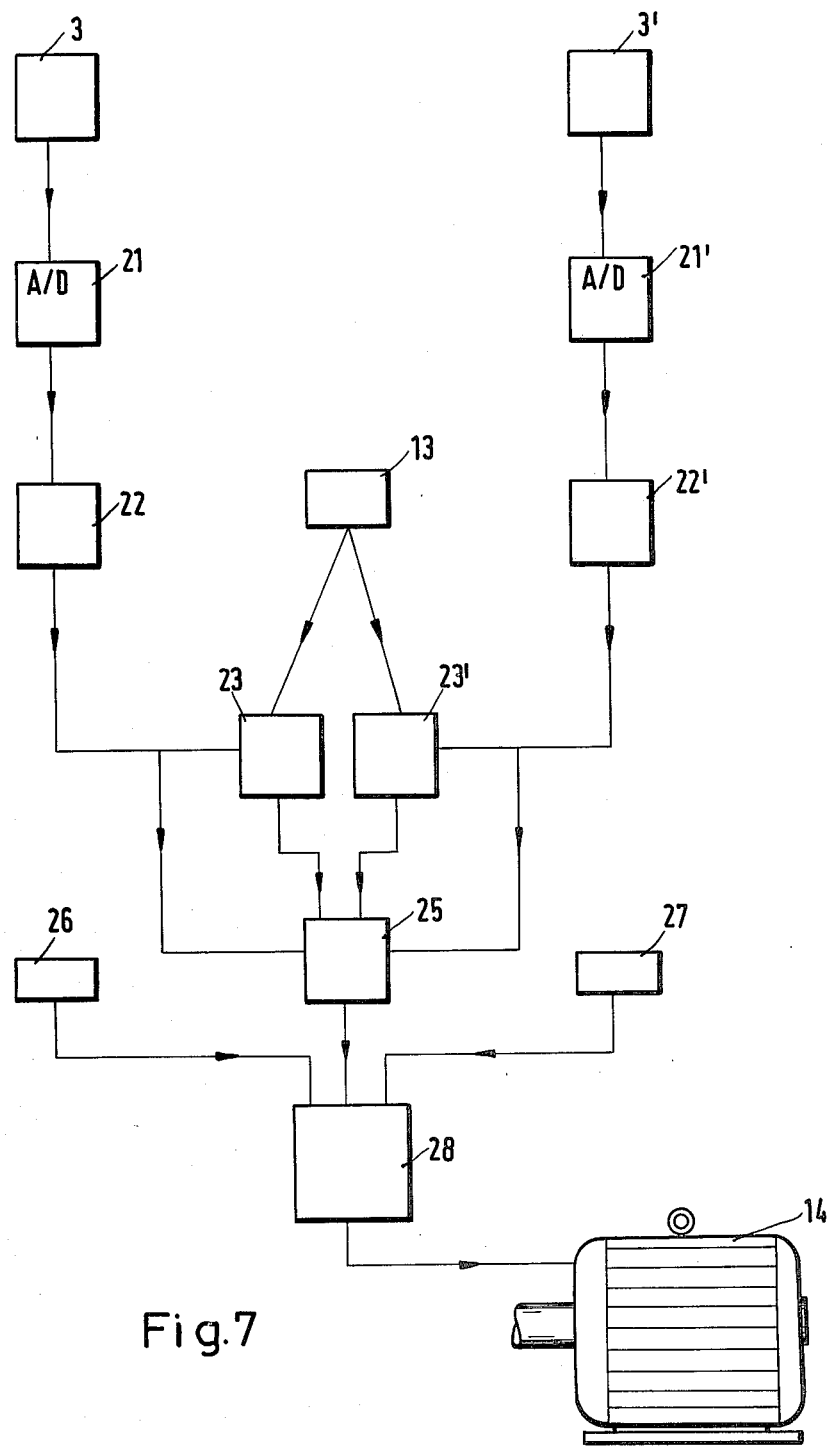
FIG. 7 is another system diagram for processing markings placed as per FIG. 5.

FIG. 5 shows a tube section with a different type of marking. The markings are provided in groups and establish two rectangular triangles being arranged so that one short side each is colinear with the respective other one ($A_1$, $A_2$), and one part or corner coincides with the respective edge, the angle of triangles at that corner being $\alpha$ (FIG. 6). The short sides are related by $B_1/A_1 = \tan \alpha = B_2/A_2$. After welding and upsetting, that corner is obliterated and now $A_3 - A_2 + A_2 - S = x$, wherein S is the desired upsetting path and x the error or deviation therefrom. FIG. 7 is a block diagram for the measurement.

We claim:

1. Method of controlling upsetting pressure during resistance welding of adjoining edges of a split tube having been made from strip or skelp, comprising the steps of
    providing markings to both sides of a gap between the not yet welded edges upstream from the welding;
    determining the width of the gap in the plane of marking;
    measuring the distance between the markings downstream from the welding; and
    controlling upsetting by maintaining said distance between prescribed limits.

2. Method as in claim 1, the markings as provided, being provided at a fixed distance.

3. Method as in claim 2, including measuring the gap width on a running basis as a corrective parameter for the controlling.

4. Method as in claim 1, the markings as provided, being provided at a distance varying with the gap.

* * * * *